(12) United States Patent
Luxenberg (10) Patent No.: US 9,160,810 B2
(45) Date of Patent: Oct. 13, 2015

(54) PARTITIONING OF A TRANSMISSION CONTROL PROTOCOL WINDOW IN A VIRTUAL SYSTEM

(71) Applicant: Red Hat Israel, Ltd., Raanana (IL)

(72) Inventor: Roni Luxenberg, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 217 days.

(21) Appl. No.: 13/660,367

(22) Filed: Oct. 25, 2012

(65) Prior Publication Data

US 2014/0123133 A1    May 1, 2014

(51) Int. Cl.
- *G06F 9/455* (2006.01)
- *H04L 29/06* (2006.01)
- *H04L 29/08* (2006.01)

(52) U.S. Cl.
CPC .......... *H04L 67/322* (2013.01); *G06F 9/45558* (2013.01); *G06F 2009/45595* (2013.01); *H04L 69/16* (2013.01)

(58) Field of Classification Search
None
See application file for complete search history.

(56) References Cited

U.S. PATENT DOCUMENTS

| 2005/0102529 A1* | 5/2005 | Buddhikot et al. ........... 713/200 |
| 2005/0108709 A1* | 5/2005 | Sciandra et al. .................. 718/1 |

\* cited by examiner

*Primary Examiner* — Emerson Puente
*Assistant Examiner* — Jonathan R Labud
(74) *Attorney, Agent, or Firm* — Lowenstein Sandler LLP (57) ABSTRACT

A mechanism for partitioning of a transmission control protocol (TCP) window in a virtual system is disclosed. A method includes estimating effective bandwidth of a communication link between a group of client devices at a first location and at least one host machine at a second location, wherein each client device of the groups of client devices maintains a communication session over the communication link with one of the at least one host machine, partitioning a transport control protocol (TCP) window of the communication link into portions based on quality of service (QoS) policy data of the communication sessions, where each portion is associated with one of the communication sessions, and sending, to each client device in the group of client devices, a parameter identifying the portion of the TCP window partitioned for the client device, the parameter sent to communication endpoints of each communication session.

20 Claims, 4 Drawing Sheets

```
┌─────────────────────────────────────────────────────────────┐
│ Establish communication session to communicate data to      │
│ provide virtual desktop for a VM                            │
│                                                        310  │
└─────────────────────────────────────────────────────────────┘
                              │
                              ▼
┌─────────────────────────────────────────────────────────────┐
│ Receive TCP window parameter from a host machine, where TCP │
│ window parameter based on QoS policy of the VM              │
│                                                        320  │
└─────────────────────────────────────────────────────────────┘
                              │
                              ▼
┌─────────────────────────────────────────────────────────────┐
│ Adjust TCP window of the communication session according to │
│ the received TCP window parameter                           │
│                                                        330  │
└─────────────────────────────────────────────────────────────┘
                              │
                              ▼
┌─────────────────────────────────────────────────────────────┐
│ Proceed with communication session configured according to  │
│ TCP window parameter                                        │
│                                                        340  │
└─────────────────────────────────────────────────────────────┘
```

PARTITIONING OF A TRANSMISSION CONTROL PROTOCOL WINDOW IN A VIRTUAL SYSTEM

TECHNICAL FIELD

The embodiments of the disclosure relate generally to virtualization system and, more specifically, relate to a mechanism for partitioning of a transmission control protocol (TCP) window in a virtual environment.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices.

In a virtualized data center, clients may connect to VMs using a remote access protocol, such as Virtual Network Computing (VNC), Remote Desktop Protocol (RDP), Independent Computing Architecture (ICA), or Simple Protocol for Independent Computing Environments (SPICE). The remote access protocol provides client access to a remote machine display and devices (e.g., keyboard, mouse, audio) to allow the user to experience a similar interaction as with a local machine, while offloading most of the intensive CPU and GPU tasks from the VM to the client device.

In a virtualization topology, communication bandwidth between clients and VMs may be limited when communicating over a Wide Area Network (WAN). Bandwidth sometimes defines the net bit rate (also known as peak bit rate, information rate or physical layer useful bit rate), channel capacity, or the maximum throughput of a logical or physical communication path in a digital communication system. In some cases, multiple client devices may share a communication connection to a data center providing VMs communicating with the client devices over the communication connection. These multiple client devices compete for the shared bandwidth on the communication connection.

Currently, different service levels (in terms of bandwidth use of the communication connection) to the different client devices may be provided by solutions such as a traffic control (tc) component or through use of existing facilities in routers and switches implementing the communication connection. These solutions limit and control the bandwidth to provide a specific service level for the multiple client devices in terms of communication bandwidth. However, these solutions have associated costs of performance inefficiency and overhead.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a mechanism for partitioning of a transmission control protocol (TCP) window in a virtual environment. A method of embodiments of the disclosure includes estimating effective bandwidth of a communication link between a group of client devices at a first location and at least one host machine at a second location, wherein each client device of the groups of client devices maintains a communication session over the communication link with one of the at least one host machine, partitioning a transport control protocol (TCP) window of the communication link into portions based on quality of service (QoS) policy data of the communication sessions, where each portion is associated with one of the communication sessions, and sending, to each client device in the group of client devices, a parameter identifying the portion of the TCP window partitioned for the client device, the parameter being sent to communication endpoints of each communication session.

Embodiments of the disclosure provide a mechanism for partitioning of a transmission control protocol (TCP) window in a virtual environment. The communication sessions between a spice server and clients may be assessed and monitored in order to dynamically adjust a TCP window of the session. The TCP window is allotted to different remote access protocol server/client connections according to priority information provided by a virtualization controller managing the virtual environment. In one embodiment, Quality of Service (QoS) policy data associated with virtual machines (VMs) provided over the communication connections is used to partitioning the TCP window into associated portions for the VMs. The monitoring of effective bandwidth of a communication connection between a remote access protocol server/client and partitioning of the TCP window may be dynamic because the bandwidth estimation and TCP window partitioning occur on an on-going and/or periodic basis.

Figure 1:
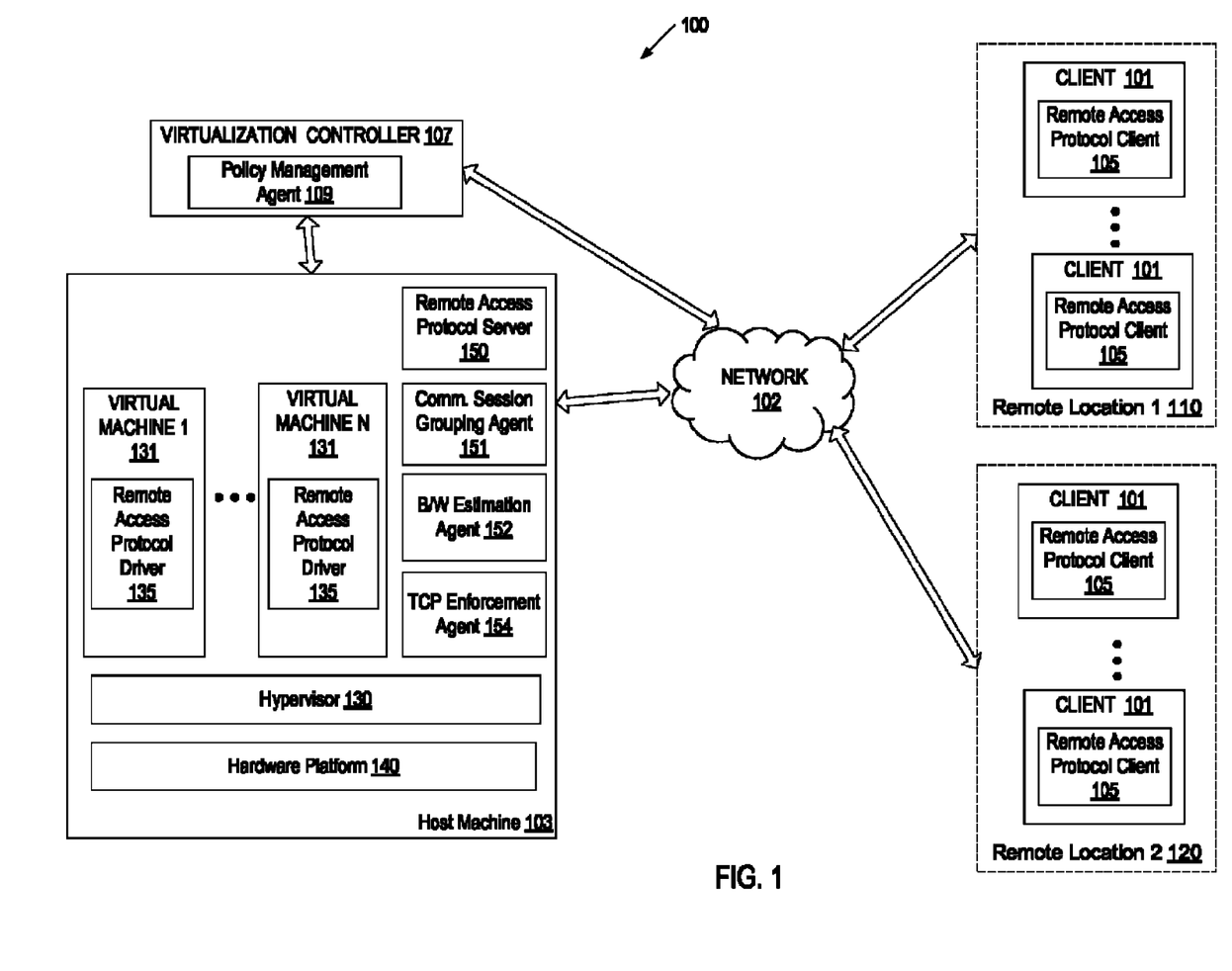
FIG. 1 is a block diagram of a virtualization system in which a TCP window is dynamically adjusted in communication sessions of a virtual environment according to some embodiments of the disclosure.

FIG. 1 is a block diagram of a virtualization system 100 in which a TCP window is dynamically adjusted in communication sessions of a virtual environment according to some embodiments of the disclosure. Referring to FIG. 1, system 100 includes, but is not limited to, client devices 101 communicably coupled to a host machine 103 over a network 102. Network 102 may be a local area network (LAN) or a wide area network (WAN) and may be a combination of one or more networks. Each server is configured to host one or more virtual machines. The host machine 103 may be coupled, via a network or directly, to a virtualization controller 107 that manages VMs 131 hosted by the host machine 105. The virtualization controller 107 may be configured to add a VM 131, delete a VM 131, balance the load on a cluster of host machines that includes the host machine 103, provide directory service to the VMs 131, and perform other management functions. Although a single host machine 103 is illustrated in FIG. 1, multiple host machines 103 may be utilized in embodiments of the disclosure.

VM 131 may include one or more applications executed and hosted by a guest operating system (OS) within the VM 131. The VM OS and the VM 131 itself may be controlled by another operating system (not shown) of the host machine 103 that runs off of a hardware platform 140 of the host machine 105. Typically, a host OS may execute a hypervisor 130 (also referred to as a virtual machine monitor (VMM)) for monitoring the hosted VM 131. A guest OS may be of the same or different type with respect to the host OS. For example, a guest OS may be a Windows™ operating system from Microsoft™ and a host OS may be a Linux™ operating system available from Red Hat, Inc.™. In addition, the guest OSes running on the different VMs 131 on the same host machine 103 may be of the same or different types.

VM 131 may be, for example, hardware emulation, full virtualization, paravirtualization, and operating system-level virtualization VMs. Different VMs 131 hosted by host machine 103 may have the same or different privilege levels for accessing different resources.

In one embodiment, VM 131 hosts or maintains a desktop environment providing virtual desktops for remote clients, including client devices 101. A virtual desktop can represent an output, such as virtual machine graphical user interface (GUI) (e.g., an image or UI to be displayed in order to represent the VM 131 at the client device 101), generated by a desktop application running within virtual machine 131. Graphics data associated with the virtual desktop can be captured and transmitted to client device 101, where the virtual machine GUI (i.e., virtual desktop) may be rendered by a rendering agent and presented by a client application.

It should be noted that functionality provided to client device 101 by VM 131 is not limited to virtual desktops and may include a wide variety of other server-based virtualization functions made available to the clients.

In some embodiments, client-side resources also include a remote access protocol client 105 that is implemented to improve end-user experience of the virtual machine interface associated with the virtual machine 131. In particular, a remote access protocol client 105 may work in tandem with a remote access protocol server 150 of the host machine 103 and a remote access protocol driver 135 of the VM 131 to determine a most efficient place to process graphics to maximize an end user experience and minimize system load. VM 131 may maintain connections with the remote access protocol client 105 and/or the remote connection protocol driver 135 via individual channels.

In one embodiment, VM 131 communicates with a remote access protocol server 150 using a multi-channel protocol (e.g., Remote Desktop Protocol (RDP), Simple Protocol for Independent Computing Environments (SPICE')) that allows for connection between VM 131 and end-user devices of the client device 101 via remote access protocol client 105 executing on client device 101. The VM 131 may include a virtual device (e.g., virtual device drivers) or a paravirtual device (e.g., using a paravirtual device drivers) for each end user device to allow the VM 131 access to control and management functions of the end user devices.

Embodiments of the disclosure utilize a communication session grouping agent 151, a bandwidth estimation agent 152, and a TCP enforcement agent 154 of host machine 103 to customize a Transport Control Protocol (TCP) window of a WAN-based communication session established between a VM 131 and a client device 101. A TCP window is a parameter of a TCP/IP communication session describing an amount of outstanding data (unacknowledged by the recipient) that can remain in the network as part of communication connection. After sending the amount of data configured in the TCP window, a sender of the data stops and waits for acknowledgment back from the receiver that the receiver has received some or all of the data. The TCP window is negotiated at the beginning of every communication connection during the TCP "handshake" stage.

In previous virtualization systems, multiple communication sessions between VMs and client devices utilizing a same WAN-based pipeline of network components that support the communication links of the communication sessions would compete against each other for the available configured TCP window. As a result, the TCP window was typically divided evenly amongst the competing communication sessions. Embodiments of the disclosure allow the TCP window to be dynamically partitioned according to Quality of Service (QoS) policies of the VMs, or according to any other priority ranking mechanism, so that each VM communication session utilizing the WAN-based link is configured with a specific, and not necessarily equal, portion of the TCP window. As a result, different service levels may be dynamically provided to different VM/client device connections.

In one embodiment, the communication session grouping agent 151 identifies network communication sessions between VMs 131 and client devices 101, and groups these sessions based on locality of the VMs and client devices 101. The communication session grouping agent 151 may reside in the host machine 103, as illustrated, or may reside at the virtualization controller 107.

In one embodiment, the remote access protocol clients 105 and remote access protocol servers 150 are the end points of the communication sessions/connections. Although one remote access protocol server 150 is illustrated per host machine 103, this remote access protocol server 150 can execute multiple remote access protocol server processes, with one remote access protocol server process associated with each VM 131 hosted by host machine 103. Each remote access protocol server process is the end point for all communication connections/channels to the associated VM 131 and is in charge of adjusting the TCP window for that VM 131.

In one embodiment, the communication sessions are grouped according to location of both endpoints, so that all communication connections belonging to the same branch office 110, 120 and communicating with one or more host machine(s) 103 at a same data center would belong to a same group of connections. For example, if there are two groups of communication sessions belonging to two different branch offices 110, 120, these different groups of communication sessions are handled separately in embodiments of the disclosure in terms of bandwidth estimation and bandwidth partitioning perspectives. More specifically, if different client devices 101 in a branch office 110, 120 connect (via remote access protocol clients 105) to remote access protocol servers 150 located in different data centers, then those client devices 101 are classified into different groups because each corresponding remote access protocol client 105 competes on available bandwidth only with other remote access protocol clients 105 connecting to the same data center of host machines 103.

In some embodiments, classification of the clients 101 according to their locations can be done based on a static configuration, Internet Protocol (IP) address/subnets of the client devices 101, physical location of the client devices 101 such as in case of mobile clients having Global Positioning System (GPS) device or based on measuring round trip time (RTT), latency between the client devices 101, and so on.

After clients 101 have been grouped based on their location, for each identified group of connections, the bandwidth estimation agent 152 assesses an effective bandwidth that is currently available between the two sites of the connection. Bandwidth is a term used to refer to a hit-rate measure representing the available or consumed data communication resources of the communication link between two communication endpoints. In one embodiment, the bandwidth estimation agent 152 may utilize any available network monitoring tool and/or agent that assess and determine the effective bandwidth. The network monitoring tool may use various techniques and heuristics, such as RTT between the sites or information and statistics queried from network entities (e.g., WAN accelerator, etc.).

Because effective bandwidth of a communication connection varies over time due to changing network conditions and network loads (e.g., equipment errors, network congestion, load fluctuations due to time of day, and so on), the bandwidth estimation agent 152 may perform the effective bandwidth estimation in an ongoing and/or periodic basis. Once an effective bandwidth is determined, the bandwidth estimation agent 152 passes this information on to the TCP enforcement agent 154.

In one embodiment, the TCP enforcement agent 154 may reside on the same host machine 103 as the bandwidth estimation agent 152. However, in other embodiments, the TCP enforcement agent 154 may reside on a different host machine than the bandwidth estimation agent 152. Furthermore, in some embodiments, the bandwidth estimation agent and the TCP enforcement agent 154 may individually, or together, operate on the virtualization controller 107.

When the TCP enforcement agent 154 receives the effective bandwidth data for a group of communication connections (e.g., between VMs 131 and client devices 101), the TCP enforcement agent 154 determines the optimal TCP window that should be configured for the pipeline having the effective bandwidth. For example, the TCP enforcement agent 154 may use the effective bandwidth as an input to determine an optimal TCP window size. In some embodiments, an optimal TCP window size may be a function of a bandwidth-delay product of the connection, which is, in turn, a function of the effective bandwidth. For example, if effective bandwidth is 10 Mbits/sec and the round trip time is 200 ms, then the TCP window size would be (10 Mbits/s)*(200 ms/2)=1 Mbit=100 KB.

In one embodiment, once the optimal TCP window size is determined, the TCP enforcement agent 154 uses QoS policy information about each communication session utilizing the effective bandwidth in order to partition the optimal TCP window among the sessions. In one embodiment, the TCP enforcement agent 154 receives QoS policy information about each VM 131 from a policy management agent 109 at the virtualization controller 107. In some embodiments, the TCP enforcement agent 154 requests this information from the policy management agent 109. In other embodiments, the policy management agent 109 may send the information to the TCP policy enforcement agent upon initialization of each new communication session of a VM 131.

In one embodiment, the QoS policy information may detail QoS profiles or classes. For example, a QoS policy manager can define platinum, gold, silver, and bronze QoS profiles. Each profile specifies a certain QoS/Service Level Agreement (SLA) level and, in turn, each connection or VM is assigned with the appropriate profile. The QoS profile may detail specific performance guarantees such as, but not limited to, priority including strict priority, minimum nominal bandwidth guaranteed, minimum percentage of bandwidth guaranteed, maximum bandwidth, and so on.

Using the QoS policy data, the TCP enforcement agent 154 can partition the determined optimal TCP window into portions that accurately reflect the QoS policy configured for the communication sessions that are sharing the effective bandwidth. For example, assume that the effective bandwidth for three communication sessions is determined to be 10 Mbits/sec, and the optimal TCP window for this effective bandwidth is determined to be 100 KB. The TCP enforcement agent 154 may then reference the QoS policies for each of the VMs associated with the communication sessions, and determine that the first session should receive a 50 KB of the TCP window, the second session should receive 30 KB of the TCP window, and the third session should receive 20 KB of the TCP window in order to satisfy the QoS parameters established for the sessions.

Once the TCP window is partitioned, the TCP enforcement agent 154 may then send a notification to the remote access protocol clients 105 associated with each session and the remote access protocol server(s) 150 associated with each session. In one embodiment, the notification includes the specific TCP window parameter to be configured for the particular communication sessions. Using this parameter information, the remote access protocol clients 105 and servers 150 may then dynamically adjust the receive/transmit TCP windows according to the provided TCP window parameters. One skilled in the art may utilize various application programming interfaces (API) and network configuration utilities that can configure the TCP window for the individual communication session.

In some embodiments, the bandwidth estimation and TCP window partitioning are performed on a periodic and/or ongoing basis in order to respond to the changing nature of the effective bandwidth over a WAN connection, as well as to the changing nature of communication sessions between VMs and client devices (e.g., VM shut downs, new VM initializations, VM migration, and so on).

In some embodiments, the bandwidth estimation agent 152 and the TCP enforcement agent 154 may monitor and enforce TCP window policies on multiple VMs running on multiple different host machines 103. If there are multiple host machines 103, then one host machine 103 may be selected at each site (e.g., data center) to execute the bandwidth estimation agent 152 and TCP enforcement agent 154 for the VMs 131 hosted at that site. In some embodiments, for example if a data center is large, then more than one bandwidth estimation agent 152 and TCP enforcement agent 154 may be executed on more than one host machine 103 at the data center.

In embodiments of the disclosure, there may be various scenarios in which the TCP window adjustment can be used to differentiate and divide the total estimated effective bandwidth among different connections/channels competing on it. For example, one scenario includes multiple channels belonging to the same session (one client and VM) that differentiate between display and video channels within the same session. In this case, the TCP window adjustment of embodiments of the disclosure may apply to the different channels of the single communication session. Another scenario includes multiple channels belonging to different sessions where the VMs are hosted on the same hypervisor and the clients are located at the same remote branch office and/or multiple channels belonging to different sessions where the VMs are hosted on different hypervisors and the clients are located in the same remote branch office. The above-described TCP window adjustment is equally applicable to these scenarios.

A further scenario may include multiple channels belonging to different sessions where the VMs are hosted on different hypervisors and the clients are located in different branch offices. For example, three clients may connect to a host machine at a data center from a branch office 1 and another three clients may connect to the same host machine from a branch office 2. In this scenario, per the above description, the clients are classified to their different locations that they are connecting from in order to correctly partition the estimated effective bandwidth between a certain branch office and the data center.

Figure 2:
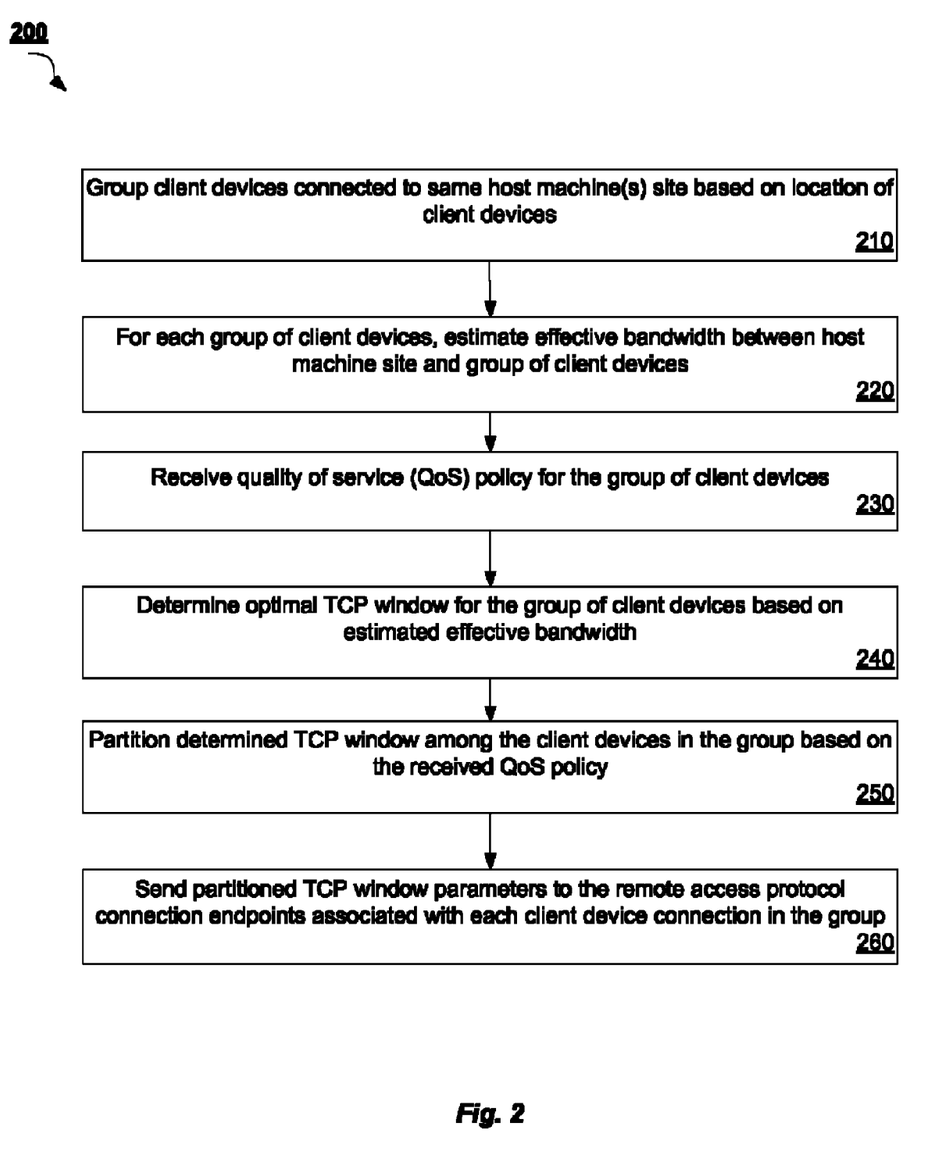
FIG. 2 is a flow diagram illustrating a method for partitioning of a TCP window in a virtualization system according to an embodiment of the disclosure.

FIG. 2 is a flow diagram illustrating a method 200 for partitioning of a TCP window in a virtualization system according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by a host machine 103, and more specifically, in some embodiments by bandwidth estimation agent 152 and TCP enforcement agent 154, of FIG. 1.

Method 200 begins at block 210 where client devices, which are connected to one or more host machines at a same location, are placed into groups based on the location of the client devices. If different clients in a branch office connect to remote access protocol servers located in different data centers, then those clients are classified into different groups. In some embodiments, classification of the clients according to their locations can be done based on client IP address/subnets, client physical location (e.g., based on GPS or RTT), latency between the clients, and so on.

Then, at block 220, for each group of client devices, an effective bandwidth is estimated between the host machine site and the site of the group of client devices. In one embodiment, a network monitoring tool and/or agent that assess effective bandwidth of a communication connection may be used to estimate effective bandwidth. For example, the network monitoring tool may use various techniques and heuristics, such as RTT between the sites or information and statistics queried from network entities (e.g., WAN accelerator, etc.).

At block 230, a QoS policy for the group of client devices is received. In one embodiment, the QoS policy information about each VM is received from a policy management agent at a virtualization controller. In some embodiments, this QoS policy information is requested from the policy management agent. In other embodiments, the policy management agent may send the QoS policy information to the TCP policy enforcement agent upon initialization of each new communication session of a VM at the host machine. In one embodiment, the QoS policy information may detail SLA guarantees for a particular connection, such as priority level (e.g., strict priority), minimum nominal bandwidth guaranteed, minimum percentage of bandwidth guaranteed, maximum bandwidth, and so on.

Subsequently, at block 240, an optimal TCP window for the group of client devices is determined. In one embodiment, the optimal TCP window calculation is a function of the estimated effective bandwidth. At block 250, the optimal TCP window is then partitioned among the communication connections of the client devices based on the received QoS policy. For example, based on the QoS policy associated with each VM, the communication sessions of the group of client devices can be ranked in a hierarchical fashion. The TCP window may then be partitioned according to this ranking so that higher ranking VM communication sessions receive a larger portion of the TCP window and lower ranking communication sessions receive a smaller portion. In other embodiments, the QoS policy may guarantee a particular TCP window size and the partitioning of the TCP window may then be made in a way that satisfies the guaranteed TCP window for the communication session(s).

Lastly, at block 260, the partitioned TCP window parameters are sent to the remote access protocol connection endpoints (e.g., remote access protocol server process and remote access protocol client) associated with each communication connection of the group of client devices. Blocks 220 and 260 are performed for each group of client devices. Furthermore, because effective bandwidth of a communication connection varies over time due to changing network conditions and network loads (e.g., equipment errors, network congestion, load fluctuations due to time of day, and so on), method 200 may be performed on a periodic basis, such a few times a day to as much as many times an hour, for example, in order to continually assess the changing bandwidth and dynamically adjust TCP window partitions based on the changing bandwidth.

Figure 3:
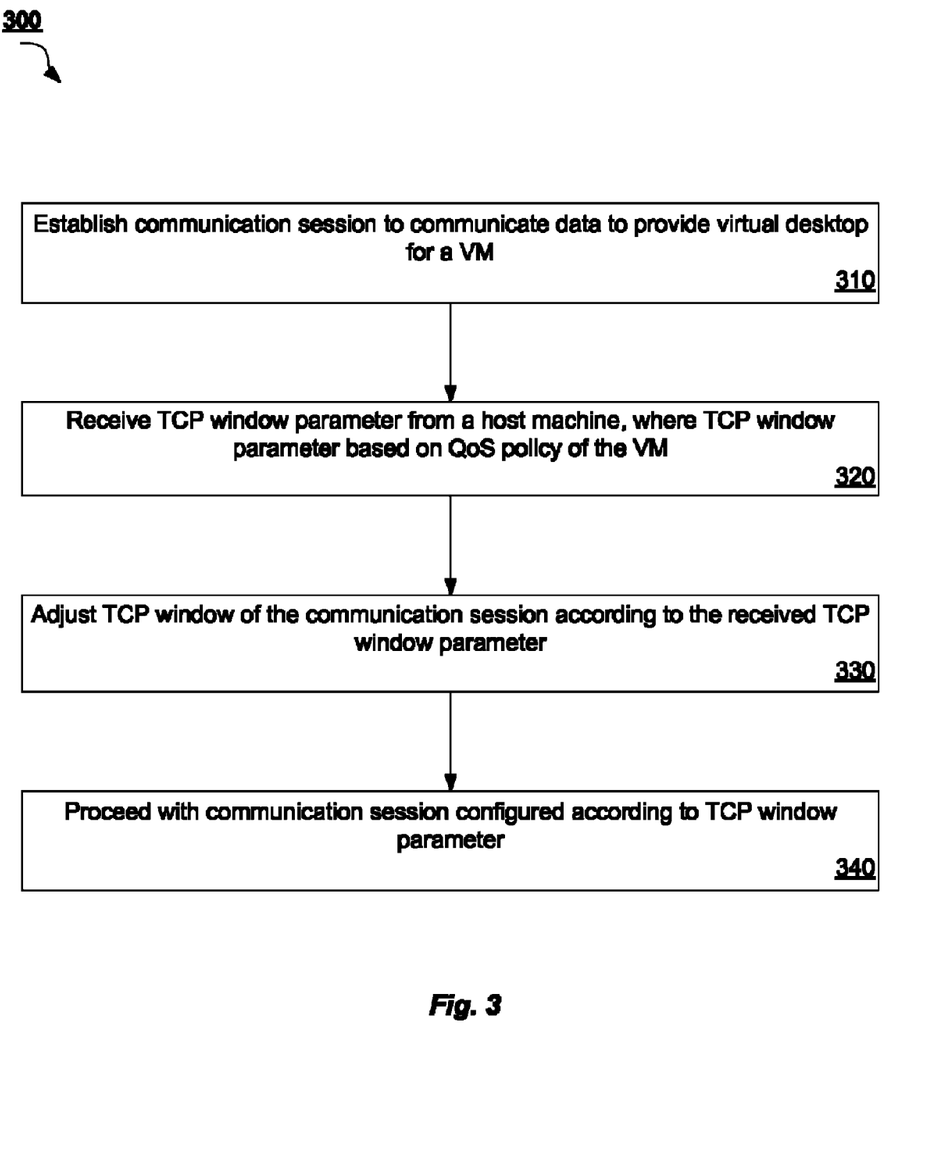
FIG. 3 is a flow diagram illustrating a method for configuring partitioning of a TCP window in a virtualization system according to an embodiment of the disclosure.

FIG. 3 is a flow diagram illustrating a method 300 for configuring partitioning of a TCP window in a virtualization system according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by remote access protocol server 150 and/or remote access protocol client 105 of FIG. 1.

Method 300 begins at block 310 where a communication session is established to communicate data to a virtual desktop for a VM. Then, at block 320, a TCP window parameter is received from a host machine. In one embodiment, the TCP window parameter identifies a portion of a larger TCP window, where the portion is specifically allotted to the VM based on a QoS policy associated with the VM. The host machine providing the TCP window parameter may include a TCP policy enforcement agent that is responsible for partitioning a TCP window for a WAN connection that the communication session utilizes.

Then, at block 330, the TCP window of the specific communication session is adjusted according to the received TCP window parameter. Lastly, at block 340, the communication session proceeds by using the TCP window parameter that was configured for the session.

Figure 4:
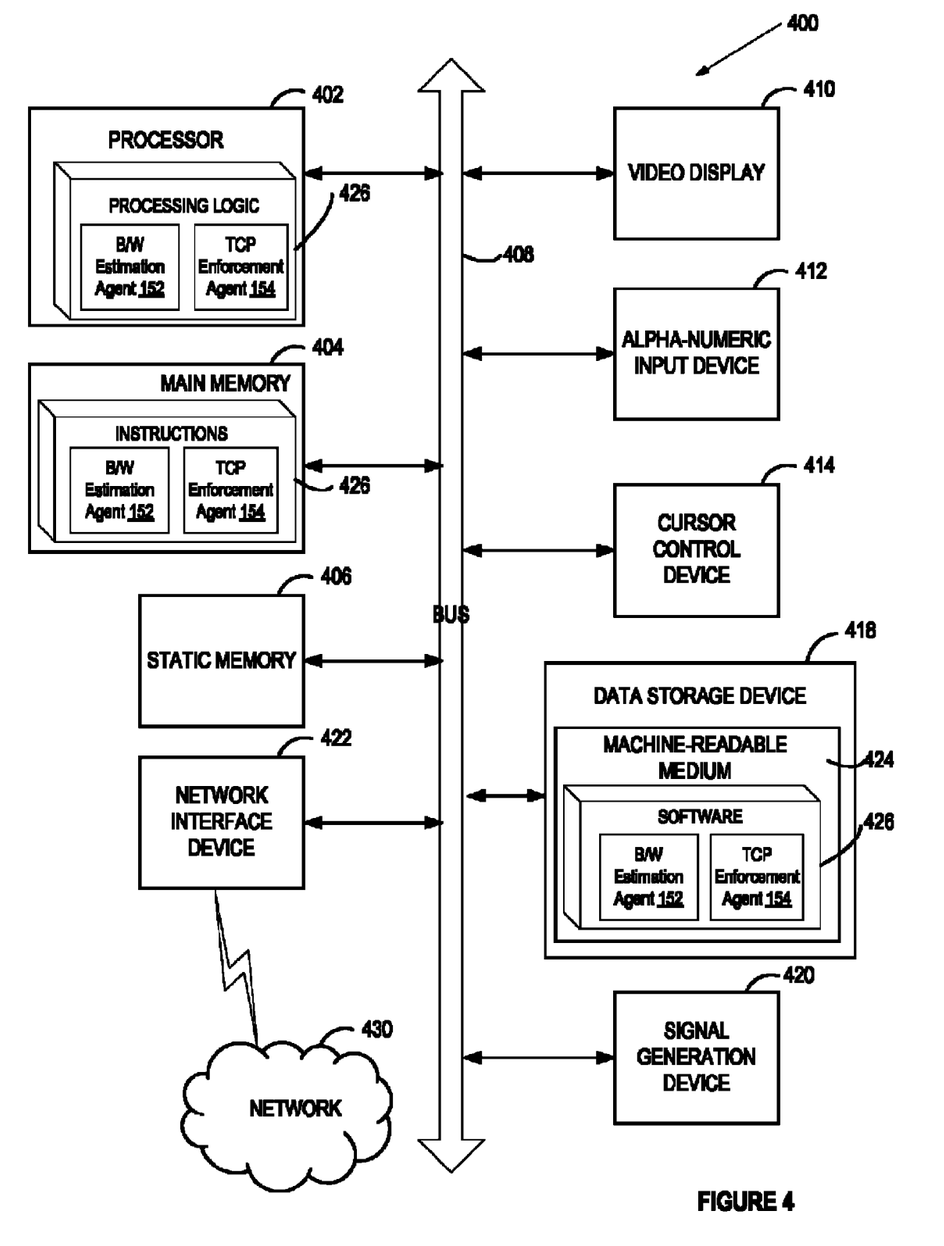
FIG. 4 illustrates a block diagram of one embodiment of a computer system.

FIG. 4 illustrates a diagrammatic representation of a machine in the example form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein, illustrated in FIG. 4 by depicting instructions 426 within processor 402.

The computer system 400 may further include a network interface device 422. The computer system 400 also may include a video display unit 410 (e.g., a liquid crystal display (LCD), a cathode ray tube (CRT), or a touchscreen), an alphanumeric input device 412 (e.g., a keyboard), a cursor control device 414 (e.g., a mouse), and a signal generation device 420 (e.g., a speaker).

The data storage device 418 may include a machine-readable storage medium 424 (also known as a computer-readable storage medium) on which is stored software 426 (e.g., one or more sets of instructions, software, etc.) embodying any one or more of the methodologies or functions described herein. The software 426 may also reside, completely or at least partially, within the main memory 404 (e.g., instructions 426) and/or within the processor 402 (e.g., processing logic 426) during execution thereof by the computer system 400, the main memory 404 and the processor 402 also constituting machine-readable storage media. The software 426 may further be transmitted or received over a network 430 via the network interface device 422.

In one embodiment, the software 426 include instructions for a bandwidth estimation agent 152 and/or a TCP enforcement agent 154, which may correspond to the similarly-named components of FIG. 1, and/or a software library containing methods that call the bandwidth estimation agent 152 and/or a TCP enforcement agent 154. While the machine-readable storage medium 424 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "estimating", "partitioning", "determining", "enabling", "identifying," "modifying", "sending", "receiving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any mechanism for storing or transmitting information in a form readable by a machine (e.g., a computer). For example, a machine-readable (e.g., computer-readable) storage medium includes a machine (e.g., a computer) readable storage medium (e.g., read only memory ("ROM"), random access memory ("RAM"), magnetic disk storage media, optical storage media, flash memory devices, etc.), etc.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   estimating, by a processing device, effective bandwidth of a communication link between a group of client devices at a first location and at least one host machine at a second location, wherein each client device of the groups of client devices maintains a communication session over the communication link with one of the at least one host machine;
   partitioning, by the processing device, a transport control protocol (TCP) window of the communication link into portions in view of quality of service (QoS) policy data of the communication sessions, wherein each portion of the TCP window is assigned for dedicated use by one of the communication sessions; and
   sending, by the processing device to each client device in the group of client devices, a parameter identifying the portion of the TCP window partitioned for the client device, the parameter sent to communication endpoints of each communication session.

2. The method of claim 1, wherein the at least one host machine executes virtual machines (VMs) that are displayed as virtual desktops by the group of client devices.

3. The method of claim 2, wherein the communication endpoints of each communication session comprise a remote access protocol client at the client device and a remote access protocol server process at the at least one host machine, the remote access protocol server process providing the communication session for a VM of the VMs that the client device displays.

4. The method of claim 3, further comprising sending, to each of the remote access protocol server processes of the communication endpoints, a parameter identifying the portion of the TCP window partitioned for the remote access protocol server process, wherein upon receiving the parameter describing the portion of the TCP window partitioned for the remote access protocol server process, the remote access protocol server process configures the TCP window setting for the communication session of the VM according to the parameter.

5. The method of claim 1, further comprising:
   identifying locations of client devices communicably coupled to the at least one host machine, the identifying in view of at least one of a static configuration, Internet Protocol (IP) addresses of the client devices, or a peer-to-peer proximity estimation protocol; and
   placing the client devices into groups in view of the identified locations, wherein the groups comprise client device having a same identified location.

6. The method of claim 1, further comprising determining the TCP window of the communication link, wherein the TCP window is a function of the estimated effective bandwidth.

7. The method of claim 2, further comprising receiving the QoS policy data from a policy management agent of a virtualization controller device managing the VMs.

8. The method of claim 1, wherein upon receiving the parameter describing the portion of the TCP window partitioned for the client device, the client device configures the TCP window setting for the communication session of the client device according to the parameter.

9. A system, comprising:
   a memory to store a repository of images associated with virtual machines (VMs);
   a processing device communicably coupled to the memory;
   a bandwidth estimation agent executable from the memory by the processing device, the bandwidth estimation agent to estimate effective bandwidth of a communication link between a group of client devices at a first location and at least one host machine at a second location, wherein each client device of the group of client devices maintains a communication session over the communication link with one of the at least one host machine; and
   a transport control protocol (TCP) enforcement agent executable from the memory by the processing device and communicably coupled to the bandwidth estimation agent, the TCP enforcement agent to:
      partition a TCP window of the communication link into portions in view of quality of service (QoS) policy data of the communication sessions, wherein each portion of the TCP window is assigned for dedicated use by one of the communication sessions; and
      send, to each client device in the group of client devices, a parameter identifying the portion of the TCP window partitioned for the client device, the parameter sent to communication endpoints of each communication session.

10. The system of claim 9, wherein the at least one host machine executes virtual machines (VMs) that are displayed as virtual desktops by the group of client devices, and wherein the communication endpoints of each communication session comprise a remote access protocol client at the client device and a remote access protocol server process at a host machine executing a VM of the VMs that the client device displays.

11. The system of claim 9, wherein the processing device is further to:
   identify locations of client devices communicably coupled to the at least one host machine; and
   place the client devices into groups in view of the identified locations, wherein the groups comprise client device having a same identified location.

12. The system of claim 11, wherein the locations of the client devices are determined in view of at least one of a static configuration, Internet Protocol (IP) addresses of the client devices, or a peer-to-peer proximity estimation protocol.

13. The system of claim 9, wherein the TCP enforcement agent is further to determine the TCP window of the communication link, wherein the TCP window is a function of the estimated effective bandwidth.

14. The system of claim 10, wherein the TCP enforcement agent is further to receive the QoS policy data from a policy management agent of a virtualization controller managing the VMs.

15. The system of claim 9, wherein upon receiving the parameter describing the portion of the TCP window partitioned for the client device, the client device configures the TCP window setting for the communication session of the client device according to the parameter.

16. A non-transitory machine-readable storage medium including instructions that, when accessed by a processing device, cause the processing device to:
- estimate, by the processing device, effective bandwidth of a communication link between a group of client devices at a first location and at least one host machine at a second location, wherein each client device of the groups of client devices maintains a communication session over the communication link with one of the at least one host machine;
- partition, by the processing device, a transport control protocol (TCP) window of the communication link into portions in view of quality of service (QoS) policy data of the communication sessions, wherein each portion of the TCP window is assigned for dedicated use by one of the communication sessions; and
- send, by the processing device to each client device in the group of client devices, a parameter identifying the portion of the TCP window partitioned for the client device, the parameter sent to communication endpoints of each communication session.

17. The non-transitory machine-readable storage medium of claim 16, wherein the communication endpoints of each communication session comprise a remote access protocol client at the client device and a remote access protocol server process at the at least one host machine, the remote access protocol server process providing the communication session for a VM of the VMs that the client device displays.

18. The non-transitory machine-readable storage medium of claim 17, wherein the processing device is further to send, to each of the remote access protocol server processes of the communication endpoints, a parameter identifying the portion of the TCP window partitioned for the remote access protocol server process, wherein upon receiving the parameter describing the portion of the TCP window partitioned for the remote access protocol server process, the remote access protocol server process configures the TCP window setting for the communication session of the VM according to the parameter.

19. The non-transitory machine-readable storage medium of claim 16, wherein the processing device is further to:
- identify locations of client devices communicably coupled to the at least one host machine, the identifying in view of at least one of a static configuration, Internet Protocol (IP) addresses of the client devices, or a peer-to-peer proximity estimation protocol; and
- place the client devices into groups in view of the identified locations, wherein the groups comprise client device having a same identified location.

20. The non-transitory machine-readable storage medium of claim 16, wherein the processing device is further to determine the TCP window of the communication link, wherein the TCP window is a function of the estimated effective bandwidth.

* * * * *